(12) United States Patent
Wang et al.

(10) Patent No.: US 12,197,685 B2
(45) Date of Patent: Jan. 14, 2025

(54) TOUCH CONTROL SUBSTRATE AND DISPLAY APPARATUS

(71) Applicants: Chengdu BOE Optoelectronics Technology Co., Ltd., Sichuan Province (CN); BOE Technology Group Co., Ltd., Beijing (CN)

(72) Inventors: Yu Wang, Beijing (CN); Cong Fan, Beijing (CN); Kemeng Tong, Beijing (CN); Fan He, Beijing (CN); Guoyi Cui, Beijing (CN); Xiangdan Dong, Beijing (CN); Jiangtao Deng, Beijing (CN)

(73) Assignees: Chengdu BOE Optoelectronics Technology Co., Ltd., Sichuan Province (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/755,108

(22) PCT Filed: Mar. 31, 2021

(86) PCT No.: PCT/CN2021/084732
§ 371 (c)(1),
(2) Date: Apr. 21, 2022

(87) PCT Pub. No.: WO2022/205212
PCT Pub. Date: Oct. 6, 2022

(65) Prior Publication Data
US 2024/0134488 A1    Apr. 25, 2024
US 2024/0231548 A9    Jul. 11, 2024

(51) Int. Cl.
*G06F 3/041*     (2006.01)
*G06F 3/044*     (2006.01)

(52) U.S. Cl.
CPC .......... *G06F 3/0445* (2019.05); *G06F 3/0412* (2013.01); *G06F 3/04164* (2019.05); *G06F 2203/04102* (2013.01)

(58) Field of Classification Search
CPC .. G06F 3/0445; G06F 3/0412; G06F 3/04164; G06F 2203/04102
See application file for complete search history.

(56) References Cited

U.S. PATENT DOCUMENTS

2006/0110908 A1    5/2006   Moriya et al.
2011/0057887 A1    3/2011   Lin et al.
(Continued)

FOREIGN PATENT DOCUMENTS

CN     1777349 A    5/2006
CN    107706214 A    2/2018
(Continued)

*Primary Examiner* — Md Saiful A Siddiqui
(74) *Attorney, Agent, or Firm* — Workman Nydegger (57) ABSTRACT

A touch control substrate includes: a base, a first metal layer including first touch control signal lines, a first insulating layer; and a second metal layer including: second touch control signal lines electrically connected with the first touch control signal lines. An orthographic projection of an edge of a first end of the first touch control signal line on the base does not overlap with an orthographic projection of an edge of a first end of the second touch control signal line electrically connected with the first touch control signal line on the base. The orthographic projection of the edge of the first end of the first touch control signal line on the base at least partially overlap with an orthographic projection of the second touch control signal line on the base.

20 Claims, 8 Drawing Sheets

(56) References Cited

U.S. PATENT DOCUMENTS

| | | | | |
|---|---|---|---|---|
| 2013/0191804 A1* | 7/2013 | Bytheway | ............. | G06F 3/0445 716/126 |
| 2014/0131069 A1* | 5/2014 | Chang | ................ | G06F 3/04164 174/250 |
| 2016/0124546 A1* | 5/2016 | Chen | .................... | G06F 3/0443 345/174 |
| 2017/0168616 A1* | 6/2017 | Feng | .................... | G06F 3/0412 |
| 2020/0106031 A1 | 4/2020 | Zhang et al. | | |
| 2020/0272011 A1 | 8/2020 | Yoshida | | |
| 2021/0305335 A1 | 9/2021 | Gao et al. | | |
| 2022/0093694 A1* | 3/2022 | Park | .................... | G06F 3/04164 |

FOREIGN PATENT DOCUMENTS

| | | | |
|---|---|---|---|
| CN | 109300947 | A | 2/2019 |
| CN | 109659320 | A | 4/2019 |
| CN | 109768052 | A | 5/2019 |
| CN | 111240518 | A | 6/2020 |
| CN | 111430566 | A | 7/2020 |
| CN | 111754878 | A | 10/2020 |

\* cited by examiner

Fig. 1

--- Prior Art ---

TOUCH CONTROL SUBSTRATE AND DISPLAY APPARATUS

CROSS REFERENCE TO RELATED APPLICATIONS

The present application is a national phase entry under 35 U.S.C. § 371 of International Application No. PCT/CN2021/084732, filed on Mar. 31, 2021.

FIELD

The present disclosure relates to the technical field of touch control, in particular to a touch control substrate and a display apparatus.

BACKGROUND

With the rapid development of an Active-matrix organic light-emitting diode (AMLOED) display industry, display apparatuses are also developing towards narrow bezel as well as lightness and thinness. At present, these high demands can be meet by adopting a Flexible Multi Layer On Cell (FMLOC) technology. When designing a display apparatus adopting the FMLOC technology, a touch control structure layer is directly manufactured on a stacked light-emitting structure layer and encapsulation layer, which can well realize lightness and thinness of products.

In the FMLOC technology, touch control signal lines (Trace line) are respectively connected to touch control electrodes in a display region from an edge of a display substrate to transmit and receive signals, and a touch control function is achieved through change of a capacitance value generated by a finger touching the touch control electrodes in the display region. In the prior art, the trace line of a folded product is disposed with double-layer metal wires, and an inorganic layer is disposed between the two layers of metal wires. However, when the folded product is bent at a large angle, the inorganic layer is prone to breakage at the end of the trace line, which leads to peeling of a film layer and the breakage of the Trace line, and the service life of the product is affected.

SUMMARY

A touch control substrate provided by embodiments of the present disclosure includes:
  a base, including: a touch control region and a peripheral region located outside the touch control region;
  a first metal layer, located on one side of the base, and including: a plurality of first touch control signal lines, and the first touch control signal lines being located in the peripheral region;
  a first insulating layer, located on one side of the first metal layer facing away from the base; and
  a second metal layer, located on one side of the first insulating layer facing away from the first metal layer, and including: a plurality of second touch control signal lines electrically connected with the first touch control signal lines in a one-to-one correspondence mode.

The second touch control signal lines are located in the peripheral region. An orthographic projection of an edge of a first end of the first touch control signal line in an extending direction the first touch control signal line on the base do not overlap with an orthographic projection of an edge of a first end of the second touch control signal line electrically connected with the first touch control signal line in an extending direction of the second touch control signal line on the base. The orthographic projection of the edge of the first end of the first touch control signal line in the extending direction the first touch control signal line on the base at least partially overlap with an orthographic projection of the second touch control signal line on the base. The first end of the first touch control signal line is a tail end of the first touch control signal line close to the touch control region in the extending direction of the first touch control signal line, and the first end of the second touch control signal line is a tail end of the second touch control signal line close to the touch control region in the extending direction of the second touch control signal line.

In some embodiments, the first end of each first touch control signal line includes a first inclined surface.

The first insulating layer includes a second inclined surface at a region covering the first inclined surface. The first insulating layer further includes: a first plane and a second plane connected with the second inclined surface in the extending direction of the first touch control signal line, and respectively located on two sides of the second inclined surface. An orthographic projection of the second plane on the base does not overlap with an orthographic projection of the first touch control signal line on the base.

The edge of the first end of the second touch control signal line in the extending direction of the second touch control signal line at least extend to a junction of the second inclined surface and the second plane.

In some embodiments, the edge of the first end of the second touch control signal line in the extending direction of the second touch control signal line extends to the second plane.

In some embodiments, a line width of the first touch control signal line is equal to a line width of the second touch control signal line in an direction perpendicular to the extending direction of the first touch control signal line.

In some embodiments, the touch control substrate further includes a touch control electrode, disposed in the touch control region. Within a range of 50 microns near a connection position of the first touch control signal line as well as the second touch control signal line and the corresponding electrically connected touch control electrode, the first touch control signal line and the second touch control signal line are electrically connected through a first via hole penetrating through the first insulating layer.

In some embodiments, the second metal layer and/or the first metal layer further include/includes:
  a plurality of connecting leads, extending from the touch control region to the peripheral region, and connected with the touch control electrode.

A first part of the second touch control signal line is connected with a connecting lead, and the first part of the second touch control signal line is adjacent to the first end of the second touch control signal line, and/or, a first part of the first touch control signal line is connected with a connecting lead, and the first part of the first touch control signal lines is adjacent to the first end of the second touch control signal line. An orthographic projection of the first part of the second touch control signal line on the base overlaps with an orthographic projection of the first part of the first touch control signal line on the base.

In some embodiments, the first end of the second touch control signal line covers at least one first via hole.

In some embodiments, the plurality of first via holes are sequentially arrayed in the extending direction of the second touch control signal line.

In some embodiments, a width-to-length ratio of each of the plurality of first via holes is approximately equal to 1.

In some embodiments, a first part of the second touch control signal line and the first end of the second touch control signal line at least cover three first via holes.

In some embodiments, the first insulating layer further includes: at least one second via hole penetrating through the thickness of the first insulating layer.

The second touch control signal line is further electrically connected with the first touch control signal line through the second via holes.

A part of one side of the first part of the second touch control signal line away from the first end of the second touch control signal line covers at least one second via hole.

In some embodiments, a width-to-length ratio of the second via hole is greater than the width-to-length ratio of the first via hole.

In some embodiments, both the touch control electrode and the connecting leads include a metal grid structure.

A display apparatus provided by embodiments of the present disclosure includes:
the touch control substrate provided by the embodiments of the present disclosure;
a flexible base substrate;
a display layer, located on the flexible base substrate; and
an encapsulation layer, located on the display layer.

The touch control substrate is located on the encapsulation layer.

BRIEF DESCRIPTION OF THE DRAWINGS

In order to illustrate the technical solutions in the embodiments of the present disclosure more clearly, drawings needing to be used in description of the embodiments will be introduced below briefly. Obviously, the drawings in the following description are only some embodiments of the present disclosure, those skilled in the art can further obtain other drawings according to these drawings without inventive efforts.

DETAILED DESCRIPTION OF THE EMBODIMENTS

In order to make the objective, technical solutions and advantages of the embodiments of the present disclosure more clear, the technical solutions of the embodiments of the present disclosure will be described clearly and completely with reference to drawings of the embodiments of the present disclosure. Obviously, the described embodiments are part of the embodiments of the present disclosure, but not all the embodiments. The embodiments in the present disclosure and features in the embodiments may be mutually combined in the case of no conflict. On the basis of the described embodiments of the present disclosure, all other embodiments obtained by those ordinarily skilled in the art without inventive efforts fall within the protection scope of the present disclosure.

Unless otherwise defined, the technical or scientific terms used in the present disclosure shall have the usual meanings understood by a person of ordinary skill in the art to which the present disclosure belongs. The words "first", "second" and the like used in the present disclosure do not indicate any order, quantity or importance, but are only used to distinguish different components. The word "including" or "containing" and the like, means that an element or item preceding the word covers an element or item listed after the word and the equivalent thereof, without excluding other elements or items. The word "connection" or "coupling" and the like is not restricted to physical or mechanical connection, but may include electrical connection, whether direct or indirect.

It should be noted that sizes and shapes of all graphs in the drawings do not reflect the true scale, and only intend to illustrate the content of the present disclosure. The same or similar reference numbers represent the same or similar elements or elements with the same or similar functions from beginning to end.

Figure 1:
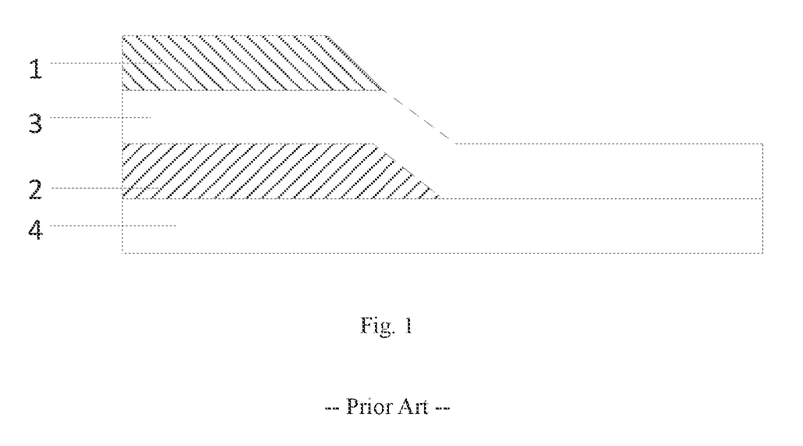
FIG. 1 is a schematic structural diagram of a touch control signal line tail end in the related art.

In the prior art, the touch control signal line (Trace line) is disposed with double-layer metal wires, as shown in FIG. 1, including: an upper-layer metal wire 1 and a lower-layer metal wire 2, and a first insulating layer 3 being disposed between the upper-layer metal wire 1 and the lower-layer metal wire 2. A region shown in FIG. 1 is a tail end of the Trace line, and the upper-layer metal wire 1 does not completely cover the lower-layer metal wire 2. When the folded product is bent at a large angle, film layer peeling and breakage of the Trace line due to breakage of the first insulating layer are prone to occurring at the tail end of the Trace line, which affects the service life of the product.

Figure 2:
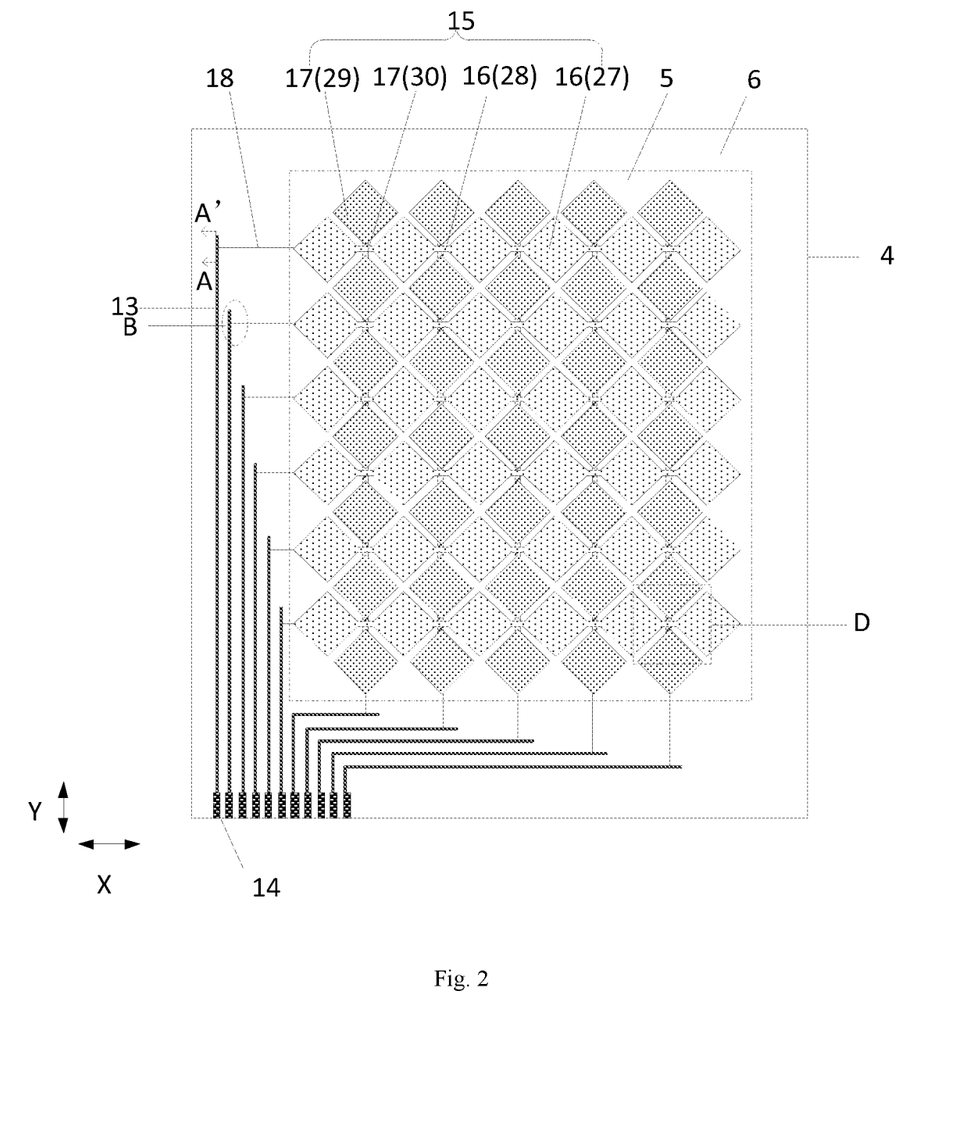
FIG. 2 is a schematic structural diagram of a touch control substrate provided by an embodiment of the present disclosure.
Figure 3:
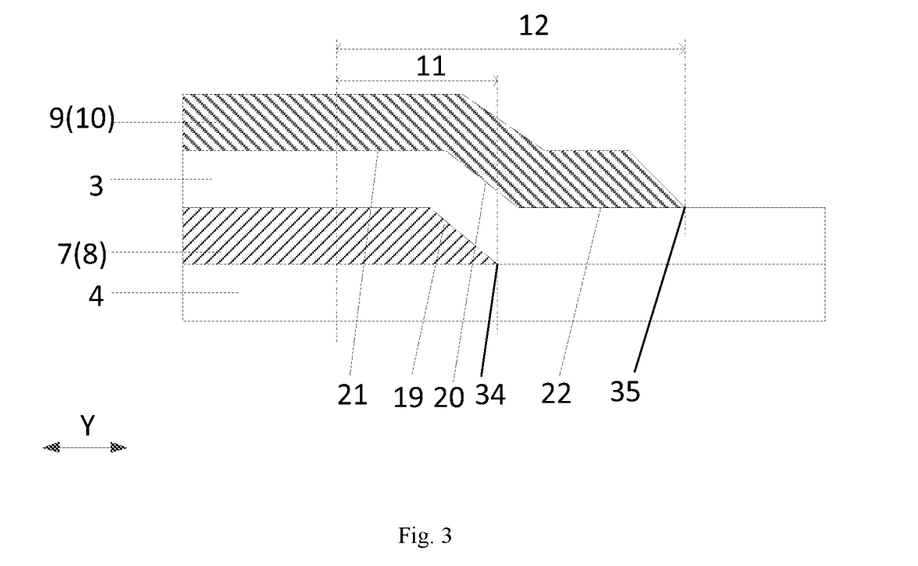
FIG. 3 is a sectional view along AA' in FIG. 2 provided by an embodiment of the present disclosure.
Figure 4:
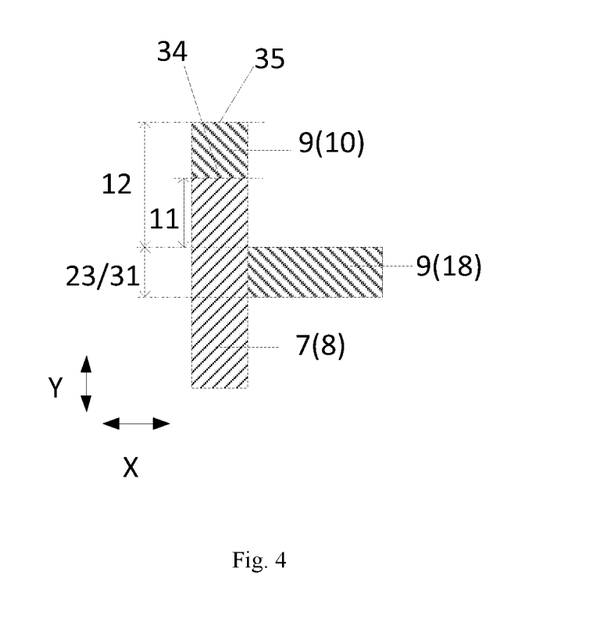
FIG. 4 is a schematic diagram of a region B in FIG. 2 provided by an embodiment of the present disclosure.

Aiming at the above problem in the related art, embodiments of the present disclosure provide a touch control substrate. As shown in FIG. 2, FIG. 3 and FIG. 4, the touch control substrate includes:
a base 4, including: a touch control region 5 and a peripheral region 6 located outside the touch control region 5;
a first metal layer 7, located on one side of the base 4, and including: a plurality of first touch control signal lines 8, and the first touch control signal lines 8 being located in the peripheral region 6;

a first insulating layer 3, located on one side of the first metal layer 7 facing away from the base 4; and a second metal layer 9, located on one side of the first insulating layer 3 facing away from the first metal layer 7, and including: a plurality of second touch control signal lines 10 electrically connected with the first touch control signal lines 8 in a one-to-one correspondence mode.

The second touch control signal lines 10 are located in the peripheral region 6. Orthographic projections of edges 34 of first ends 11 of the first touch control signal lines 8 in an extending direction of the first touch control signal lines 8 on the base 4 do not overlap with orthographic projections of edges 35 of first ends 12 of the second touch control signal lines 10 electrically connected with the first touch control signal lines 8 in an extending direction of the second touch control signal lines 10 on the base 4. The orthographic projections of the edges 34 of the first ends 11 of the first touch control signal lines 8 in the extending direction of the first touch control signal lines 8 on the base 4 at least partially overlap with orthographic projections of the second touch control signal lines 10 on the base 4. The first ends 11 of the first touch control signal lines 8 are tail ends of the first touch control signal lines 8 close to the touch control region in the extending direction of the first touch control signal lines 8, and the first ends 12 of the second touch control signal lines 10 are tail ends of the second touch control signal lines 10 close to the touch control region 5 in the extending direction of the second touch control signal lines 10.

According to the touch control substrate provided by the embodiments of the present disclosure, the orthographic projections of the edges of the first ends of the first touch control signal lines in the extending direction of the first touch control signal lines on the base do not overlap with the orthographic projections of the edges of the first ends of the second touch control signal lines electrically connected with the first touch control signal lines in the extending direction of the second touch control signal lines on the base, and the orthographic projections of the edges of the first ends of the first touch control signal lines in the extending direction of the first touch control signal lines on the base at least partially overlap with the orthographic projections of the second touch control signal lines on the base, that is, a part of the first insulating layer covering the tail ends of the first touch control signal lines close to the touch control region is covered by the tail ends of the second touch control signal lines close to the touch control region. When the folded product is bent at a large angle, the film layer peeling and the breakage of the touch control signal lines caused by the breakage of the first insulating layer at the tail ends of the first touch control signal lines close to the touch control region can be avoided, which can improve a product yield and increase the service life of the product.

It should be noted that each touch control signal line 13 in FIG. 2 includes the first touch control signal line 8 and the second touch control signal line 10. FIG. 3 may be, for example, a sectional view along AA' in FIG. 2. FIG. 4 may be, for example, a schematic enlarged diagram of a region B. In order to clearly show a projection relationship between the first touch control signal lines and the second touch control signal lines, the first touch control signal lines 8 are disposed on the upper layer for displaying in FIG. 4.

In some embodiments, as shown in FIG. 2, the touch control region 5 further includes a plurality of touch control electrodes 15. The touch control substrate further includes a plurality of connecting leads 18 extending from the touch control region 5 to the peripheral region 6, and each connecting lead 18 connects the touch control electrode 15 with the touch control signal line 13.

In some embodiments, the plurality of touch control electrodes 15 include a plurality of first touch control electrodes 16 and a plurality of second touch control electrodes 17. Each first touch control electrode 16 extends in a first direction X, the plurality of first touch control electrodes 16 are arrayed in a second direction Y, each second touch control electrode 17 extends in the second direction Y, and the plurality of second touch control electrodes 17 are arrayed in the first direction X.

In some embodiments, as shown in FIG. 2, the first touch control electrode 16 may be divided into a plurality of first electrode blocks 27 arrayed in the first direction X, and two adjacent first electrode blocks 27 in the same first touch control electrode 16 are electrically connected through a first connection part 28. The second touch control electrode 17 may be divided into a plurality of second electrode blocks 29 arrayed in the second direction Y, and two adjacent second electrode blocks 29 in the same second touch control electrode 17 are electrically connected through a second connection part 30.

During specific implementation, the first electrode blocks, the second electrode blocks and the second connection parts may be disposed in the same layer, and the first connection parts are located in the different layer from the first electrode blocks, the second electrode blocks and the second connection parts.

In some embodiments, the second metal layer further includes: the first electrode blocks, the second electrode blocks, the second connection parts and the plurality of connecting leads; and the first metal layer further includes the first connection parts.

As shown in FIG. 4, each connecting lead 18 connects the touch control electrode and the second touch control signal line 10 and extends from the touch control region 5 to the peripheral region 6. A first part 23 of the second touch control signal line 10 is connected with the connecting lead 18, and the first part 23 of the second touch control signal line 10 is adjacent to the first end 12 of the second touch control signal line 10.

Or, in some embodiments, the first metal layer further includes: the first electrode blocks, the second electrode blocks, the second connection parts and the plurality of connection leads; and the second metal layer further includes the first connection parts.

Figure 5:
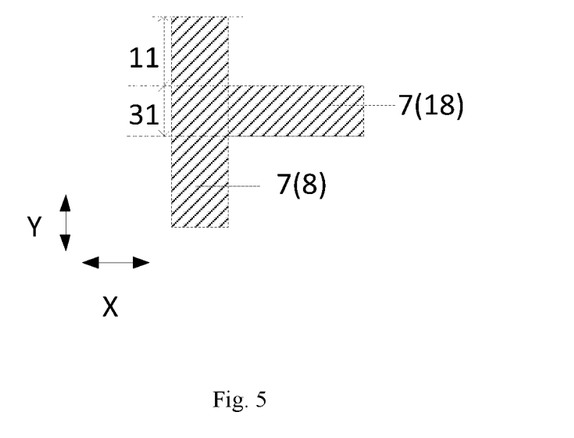
FIG. 5 is a schematic structural diagram of another touch control substrate provided by an embodiment of the present disclosure.

As shown in FIG. 5, each connecting lead 18 connects the touch control electrode and the first touch control signal line 8 and extends from the touch control region 5 to the peripheral region 6. A first part 31 of the first touch control signal line 8 is connected with the connecting lead 18, and the first part 31 of the first touch control signal line 8 is adjacent to the first end 11 of the first touch control signal line 8.

It should be noted that the second touch control signal line is not shown in FIG. 5.

Of course, it may also be that the first electrode blocks and the first connection parts are disposed in the same layer, the second electrode blocks and the second connection parts are disposed in the same layer, and the first connection parts and the first electrode blocks are located in the different layer from the second electrode blocks and the second connection parts. For example, the first metal layer includes: the first electrode blocks, the first connection parts, and the connecting leads connected with the first touch control electrodes, and the connecting leads connected with the first touch control electrodes are connected with the first parts of the first touch control signal lines. The second metal layer includes: the second electrode blocks, the second connection parts, and the connecting leads connected with the second touch control electrodes, and the connecting leads connected with the second touch control electrodes are connected with the first parts of the second touch control signal lines. Or, the second metal layer includes: the first electrode blocks, the first connection parts, and the connecting leads connected with the first touch control electrodes, and the connecting leads connected with the first touch control electrodes are connected with the first parts of the first touch control signal lines. The first metal layer includes: the second electrode blocks, the second connection parts, and the connecting leads connected with the second touch control electrodes, and the connecting leads connected with the second touch control electrodes are connected with the first parts of the second touch control signal lines.

It should be noted that, as shown in FIG. 2, the touch control substrate further includes pad electrode(s) 14. During implementations, each touch control signal line 13 and the pad electrode 14 are connected to a driver at the peripheral region 6. The driver applies driving signals to the second touch control electrodes 17 through the touch control signal lines 13, and receives output signals from the first touch control electrodes 16. Or, the driver may apply the driving signals to the first touch control electrodes 16 and receive output signals from the second touch control electrodes 17. The driver may determine a location where touch occurs by detecting sensing signals generated in a plurality of electrodes when the different electrodes transmit touch control signals. In some embodiments, the first touch control electrodes may be driving electrodes (Tx), the second touch control electrodes may be sensing electrodes (Rx), or the first touch control electrodes may be sensing electrodes (Rx), and the second touch control electrodes may be driving electrodes (Tx).

It should be noted that the first touch control electrodes and the second touch control electrodes constitute a touch control structure. As shown in FIG. 2, the D region may be regarded as a repeating unit of the touch control structure. In some embodiments, an outline of the D region is a square with a side length of 4 mm.

It should be noted that, in FIG. 2, the connecting lead 18 is represented by a line segment, which is only to simply illustrate a connection relationship among the touch control signal line, the connecting lead, and the touch control electrodes. In FIG. 4 and FIG. 5, only a straight line is configured to represent the connecting lead 18 to simply illustrate the connection relationship between the connecting lead and the touch control signal lines. Moreover, FIG. 2 only takes a shape of the touch control electrode as a rhombus for illustration. During implementations, the touch control electrodes and the connecting leads may adopt other disposing forms.

Figure 6:
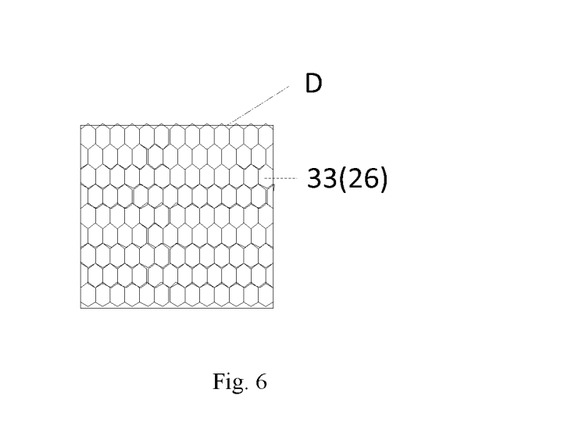
FIG. 6 is a schematic diagram of a metal grid structure in a touch control electrode provided by an embodiment of the present disclosure.
Figure 7:
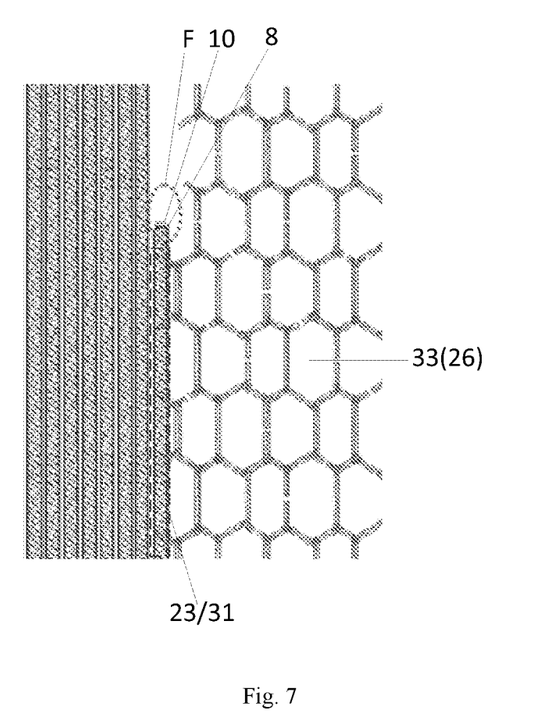
FIG. 7 is a schematic diagram of connection between a connecting lead and a touch control signal line provided by an embodiment of the present disclosure.

In some embodiments, as shown in FIG. 6 and FIG. 7, both the touch control electrodes and the connecting leads include a metal grid structure 33.

It should be noted that in FIG. 6, one repeating unit, that is, a pattern of the D region in FIG. 2 is taken as an example for illustration.

It should be noted that FIG. 7 only shows a part of a region where the metal grid structure 33 is connected with the touch control signal lines. A region F in FIG. 7 includes: the first end of the first touch control signal line 8 in its extending direction, and the first end of the second touch control signal line 10 in its extending direction. In FIG. 7, taking an example that the first touch control signal lines 8 are shown on the upper layer, it can be seen from FIG. 7 that the orthographic projection of the edge of the first end of the first touch control signal line 8 in its extending direction on the base do not overlap with the orthographic projection of the edge of the first end of the second touch control signal line 10 electrically connected with the first touch control signal line 8 in its extending direction on the base, and the orthographic projection of the edge of the first end of the first touch control signal line 8 in its extending direction on the base at least partially overlap with the orthographic projection of the second touch control signal line 10 on the base.

During implementations, the metal grid structure connected with the touch control signal lines is integrally connected with the metal grid structure of the touch control electrodes, that is, the touch control electrodes and the connecting leads are of an integrated structure, and a part, connected with the touch control signal lines, in the metal grid structure is called the connecting lead.

During implementations, the metal grid structure is formed by interweaving a plurality of metal wires. The metal grid structure includes a plurality of grid patterns. The grid pattern is a polygon formed by a plurality of metal wires. In other words, a metal grid is formed by splicing grid patterns in a repeating and continuous disposing mode. The shape of the grid pattern enclosed by the metal wires may be rhombus. Or, the shape of the grid pattern enclosed by the metal wires may be a triangle, or the shape of the grid pattern enclosed by the metal wires may be a rectangle. Or, as shown in FIG. 6 and FIG. 7, the shape of grid pattern 26 enclosed by the metal wires may be a hexagon, or the shape of the grid pattern enclosed by the metal wires may be a combination of various shapes, such as a combination of a pentagon and a hexagon, or the shape of the grid pattern enclosed by the metal wires may include any one or more of the triangle, a square, the rectangle, the rhombus, a trapezoid, the pentagon and the hexagon. During implementations, the grid pattern enclosed by the metal wires may be a regular shape or an irregular shape, and sides of the grid pattern may be straight lines or curves, which is not limited in the embodiment of the present disclosure.

During implementations, a plurality of notches may be disposed on the metal grid, so as to realize isolation of the grid patterns of the first touch control electrodes and the grid patterns of the second touch control electrodes.

The first touch control electrodes, the second touch control electrodes and the connecting leads in the form of the metal grid structure have the advantages of small resistance, small thickness, high response speed and the like. The sensitivity and accuracy of touch recognition may be improved.

During implementations, shapes and sizes of grids in the metal grid structure of the touch control electrodes may be consistent with shapes and sizes of grids in the metal grid structure of the connecting leads.

During implementations, when the metal grid structure is connected with the first part of the second touch control signal line or the first part of the first touch control signal line, the first part of the second touch control signal line or the first part of the first touch control signal line is connected with at least one metal wire. In FIG. 7, illustration is made by taking an example that the first part of the second touch control signal line 10 is connected with a plurality of metal wires.

It should be noted that in FIG. 4 and FIG. 5, a width of the first part of the second touch control signal line and the first part of the second touch control signal line in the extending direction of the touch control signal lines is equal to a width of a connecting region between the connecting lead and the touch control signal lines.

Certainly, during implementations, when the second touch control signal line is connected with the connecting lead, the first part of the second touch control signal line may also be a region within ±10 microns of a position connected with the connecting lead in the extending direction of the second touch control signal line. When the first touch control signal line is connected with the connecting lead, the first part of the first touch control signal line may also be a region within ±10 microns of a position connected with the connecting lead in the extending direction of the first touch control signal line.

During implementations, when the connecting leads and the touch control electrodes are of the metal grid structure, the first part of the first touch control signal line or the first part of the second touch control signal line is: in the extending direction of the touch control signal line, from a region where the first metal wire is connected with the touch control signal line to a region where the last metal wire is connected with the touch control signal line. Of course, it may also be a region within ±10 microns from the region where the first metal wire is connected with the touch control signal line to the region where the last metal wire is connected with the touch control signal line in the extending direction of the touch control signal line.

In some embodiments, as shown in FIG. 3, the first end 11 of each first touch control signal line 8 includes a first inclined surface 19.

The first insulating layer 3 includes a second inclined surface 20 at a region covering the first inclined surface 19. The first insulating layer 3 further includes: a first plane 21 and a second plane 22 connected with the second inclined surface 20 in the extending direction (such as the second direction Y in FIG. 3) of the first touch control signal line, and respectively located on two sides of the second inclined surface 20. An orthographic projection of the second plane 22 on the base 4 does not overlap with the orthographic projections of the first touch control signal lines 8 on the base 4.

The edge 35 of the first end 12 of the second touch control signal line 10 in its extending direction at least extend to a junction of the second inclined surface 20 and the second plane 22.

According to the touch control substrate provided by the embodiments of the present disclosure, the edges of the first ends of the second touch control signal lines in the extending direction of the second touch control signal lines at least extend to the junction of the second inclined surface and the second plane, so that the orthographic projections of the edges of the first ends of the first touch control signal lines in the extending direction of the first touch control signal lines on the base may not overlap with the orthographic projections of the edges of the first ends of the second touch control signal lines electrically connected with the first touch control signal lines in the extending direction of the second touch control signal lines on the base, and the orthographic projections of the edges of the first ends of the first touch control signal lines in the extending direction of the second touch control signal lines on the base at least partially overlap with the orthographic projections of the second touch control signal lines on the base. Therefore, a part of the first insulating layer covering the tail ends of the first touch control signal lines close to the touch control region is covered by the tail ends of the second touch control signal lines close to the touch control region. When the folded product is bent at a large angle, the film layer peeling and the breakage of the touch control signal lines caused by the breakage of the first insulating layer at the tail ends of the first touch control signal lines close to the touch control region can be avoided, which can improve a product yield and prolong the service life of the product.

In some embodiments, as shown in FIG. 3, the edge 35 of the first end 12 of the second touch control signal line 10 in its extending direction extend to the second plane 22.

In some embodiments, as shown in FIG. 4, a line width of the first touch control signal line 8 is equal to a line width of the second touch control signal line 10 in a direction perpendicular to an extending direction (such as a second direction Y in FIG. 4) of the first touch control signal line 8.

In some embodiments, within a range of 50 microns near a connection position of the first touch control signal line as well as the second touch control signal line and the corresponding electrically connected touch control electrode, the first touch control signal line and the second touch control signal line are electrically connected through a first via hole penetrating through the first insulating layer.

Figure 8:
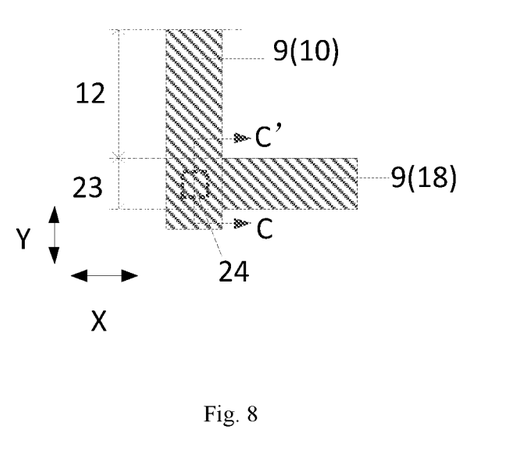
FIG. 8 is a schematic structural diagram of another touch control substrate provided by an embodiment of the present disclosure.
Figure 9:
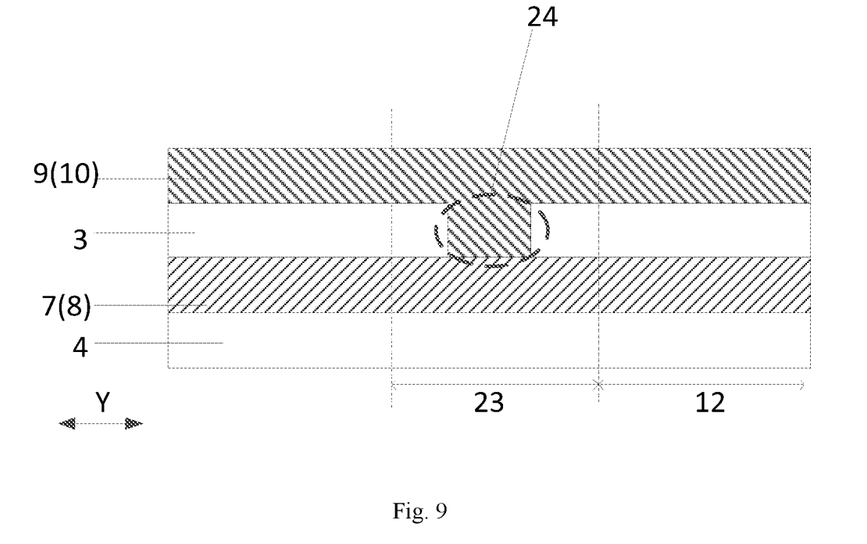
FIG. 9 is a sectional view along CC' in FIG. 8 provided by an embodiment of the present disclosure.

That is, in some embodiments, as shown in FIG. 8 and FIG. 9, the first insulating layer includes: at least one first via hole 24 penetrating through the thickness of the first insulating layer.

The second touch control signal line 10 is electrically connected with the first touch control signal line 8 through the first via hole 24; and the first part 23 of the second touch control signal line 10 covers the at least one first via hole 24.

It should be noted that in the related art, a region where the via hole where the second touch control signal line is electrically connected with the first touch control signal line is disposed is far from the first part of the second touch control signal line and the first part of the first touch control signal line, which affects connection performance between the touch control signal line and the connecting lead.

According to the touch control substrate provided by the embodiments of the present disclosure, within the range of 50 microns near the connection position of the first touch control signal lines as well as the second touch control signal lines and the corresponding electrically connected touch control electrode, the first touch control signal lines and the second touch control signal lines are electrically connected through the first via holes penetrating through the first insulating layer. A distance between a region where the two layers of touch control signal lines are connected and the part where the touch control signal lines and the connecting leads are connected is close, which can improve the connection performance between the touch control signal lines and the connecting leads, and improve a transmission effect of the touch control signals, thereby improving the accuracy of touch recognition.

It should be noted that in FIG. 8, illustration is made by taking an example that the connecting lead 18 and the second touch control signal line 10 are disposed in the same layer and connected. During implementations, for a case that the connecting lead and the first touch control signal line are disposed in the same layer and connected, since the orthographic projection of the first part of the second touch control signal lines on the base overlaps with the orthographic projection of the first part of the first touch control signal lines on the base, the region where the first via hole 24 is located may still be disposed in the region shown in FIG. 8, which will not be repeated here. The disposing position of the first via hole is illustrated in the present disclosure subsequently by taking an example that the connecting leads and the second touch control signal lines are disposed in the same layer and connected.

It should be noted that FIG. 9 may be, for example, a sectional view along CC' in FIG. 8. FIG. 8 does not show the first insulating layer, but only shows the region where the first via hole 24 is located.

It should be noted that in FIG. 9, illustration is made by taking an example that the first part of the second touch control signal line covers one first via hole. Of course, during implementations, the first part of the second touch control signal line may also cover more first via holes, so as to further improve the connection performance between the touch control signal line and the connecting lead.

Figure 10:
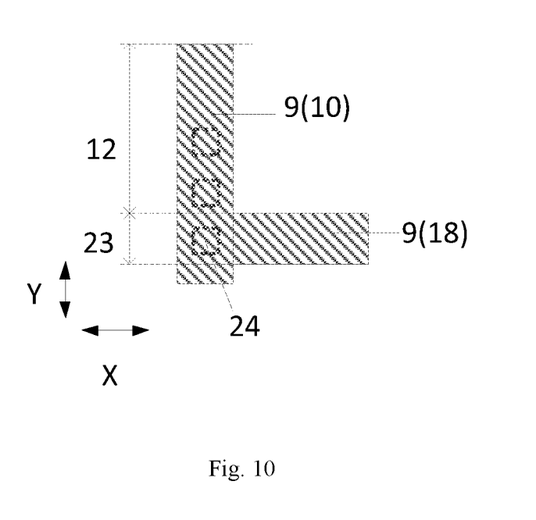
FIG. 10 is a schematic structural diagram of another touch control substrate provided by an embodiment of the present disclosure.

In some embodiments, as shown in FIG. 10, the first end 12 of the second touch control signal line 10 cover at least one first via hole 24.

That is, according to the touch control substrate provided by the embodiments of the present disclosure, the first via hole is also disposed in a region adjacent to the first part of the second touch control signal lines, so that the first touch control signal lines and the second touch control signal lines are electrically connected. That is, the quantity of the first via holes near the connection region between the connecting leads and the touch control signal lines is increased, which further improves the connection performance between the touch control signal lines and the connecting leads, improves the transmission effect of the touch control signals, and improves the accuracy of touch recognition.

In some embodiments, as shown in FIG. 10, the plurality of first via holes 24 are sequentially arrayed in the extending direction (such as the second direction Y in FIG. 10) of the second touch control signal lines 10.

In some embodiments, a shape of the orthographic projection of the first via hole on the base may be, for example, a rectangle, a square, a rounded rectangle, a circle, and the like. Taking a square first via hole as an example, a side length of the square is about 3 microns.

In some embodiments, when the shape of the orthographic projection of the first via hole on the base is the rectangle, as shown in FIG. 10, a width-to-length ratio of each of the plurality of first via holes is approximately equal to 1.

In some embodiments, when the first part of the second touch control signal lines and the nearby touch control signal lines cover the plurality of first via holes sequentially arrayed in the extending direction of the touch control signal lines, a distance between the first and the last of the plurality of first via holes is less than the side length of one repeating unit, that is, the distance between the first and the last of the plurality of first via hole is less than 4 mm.

Figure 11:
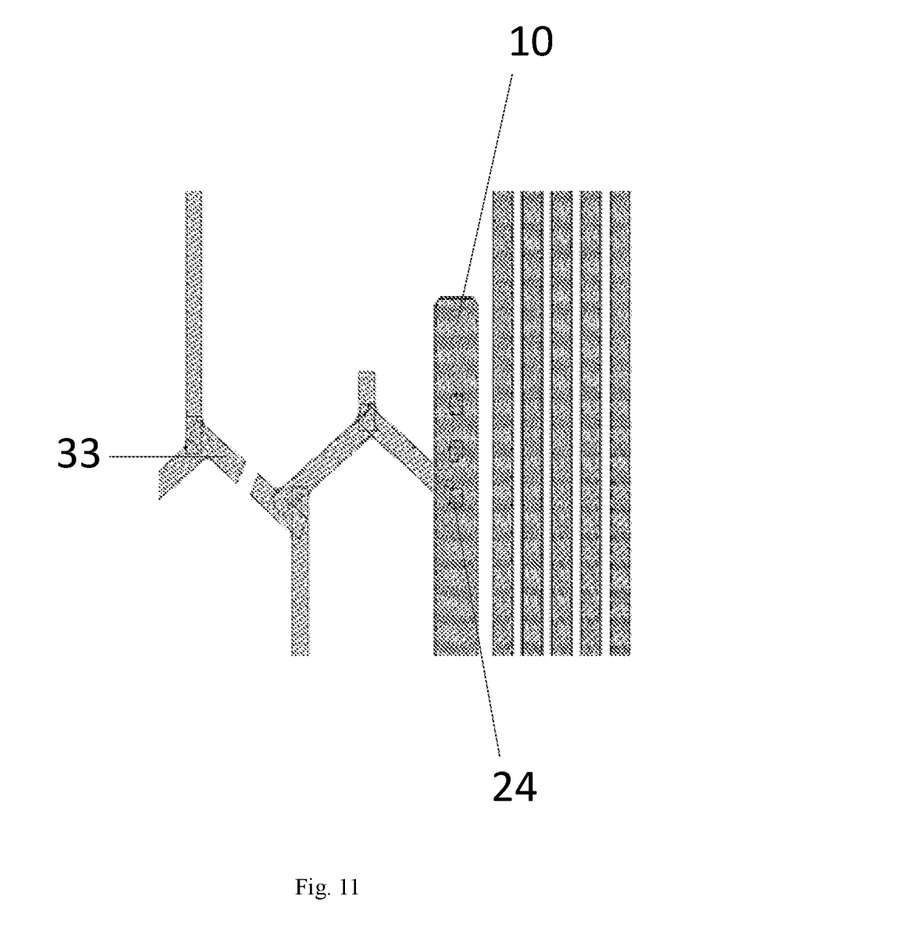
FIG. 11 is a schematic structural diagram of another touch control substrate provided by an embodiment of the present disclosure.

During implementations, as shown in FIG. 11, when the first part of the second touch control signal lines 10 or the first part of the first touch control signal lines is connected with the plurality of metal wires in the metal grid structure 33, the at least one first via hole may be disposed in the region where each metal wire is connected with the first part of the second touch control signal lines 10 or the first part of the first touch control signal lines, so as to improve the connection performance between the touch control signal lines and the connecting lead, and improve the transmission effect of the touch control signals, and improve the accuracy of touch recognition. It should be noted that FIG. 11 only shows one metal wire connected with the touch control signal lines.

In some embodiments, as shown in FIG. 10, the first part 23 of the second touch control signal line 10 and the first end 12 of the second touch control signal line 10 at least cover three first via holes 24.

Figure 12:
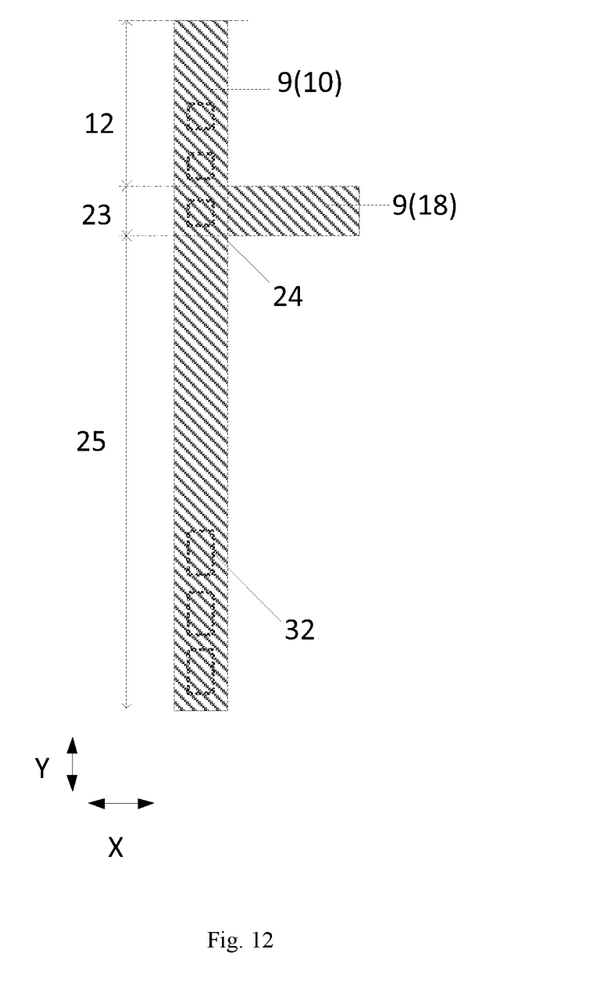
FIG. 12 is a schematic structural diagram of another touch control substrate provided by an embodiment of the present disclosure.

In some embodiments, as shown in FIG. 12, the first insulating layer further includes: at least one second via hole 32 penetrating through the thickness of the first insulating layer.

The second touch control signal lines 10 are further electrically connected with the first touch control signal lines through the second via holes 32.

A part 25 of one side of the first part 23 of the second touch control signal lines 10 away from the first ends 12 of the second touch control signal lines 10 covers the at least one second via hole 32.

That is, according to the touch control substrate provided by the embodiments of the present disclosure, at a region outside the region where the touch control signal lines are connected with the connecting lead and away the tail ends of the touch control signal lines, the second via hole(s) for electrically connecting the two layers of the touch control signal lines is further disposed, thereby further improving the connection performance of the first touch control signal lines and the second touch control signal lines, improving the transmission effect of the touch control signals, and improving the accuracy of touch recognition.

In some embodiments, a width-to-length ratio of the second via hole is greater than the width-to-length ratio of the first via hole.

That is, in some embodiments, the shape of the first via hole is the square, and the shape of the second via hole is the rectangle. A display apparatus provided by an embodiment of the present disclosure includes:

the touch control substrate provided by the embodiments of the present disclosure;
a flexible base substrate;
a display layer, located on the flexible base substrate; and
an encapsulation layer, located on the display layer.

The touch control substrate is located on the encapsulation layer.

In some embodiments, the display layer includes a pixel driving circuit located on a flexible base substrate and an electroluminescent device electrically connected with the pixel driving circuit. The electroluminescent device may be, for example, an organic light-emitting diode device or a quantum dot light-emitting diode device.

The display apparatus provided by the embodiments of the present disclosure may be: any product or component with a display function, such as a mobile phone, a tablet computer, a television, a displayer, a notebook computer, a digital photo frame, and a navigator. It should be understood by a person of ordinary skill in the art that the display apparatus should have other essential constituent parts, which is not repeated here and should not be regarded as limitation to the present disclosure. Implementation of the display apparatus may refer to embodiments of the above touch control substrate, and repetitions are omitted.

To sum up, according to the touch control substrate and the display apparatus provided by the embodiments of the present disclosure, the orthographic projections of the edges of the first ends of the first touch control signal lines in its extending direction on the base do not overlap with the orthographic projections of the edges of the first ends of the second touch control signal lines electrically connected with the first touch control signal lines in its extending direction on the base, and the orthographic projections of the edges of the first ends of the first touch control signal lines in its extending direction on the base at least partially overlap with the orthographic projections of the second touch control signal lines on the base, that is, the part of the first insulating layer covering the tail ends of the first touch control signal lines close to the touch control region is covered by the tail ends of the second touch control signal lines close to the touch control region. When a folded product is bent at a large angle, film layer peeling and the breakage of the touch control signal lines caused by breakage of the first insulating layer at the tail ends of the first touch control signal lines close to the touch control region can be avoided, which can improve a product yield and prolong the service life of the product.

Although the preferred embodiments of the present invention have been described, those skilled in the art can make additional modifications and variations on these embodiments once they know the basic creative concept. Therefore, the appended claim intends to be explained as including the preferred embodiments and all modifications and variations falling within the scope of the present invention.

Obviously, those skilled in the art can make various modifications and variations to the embodiment of the present invention without departing from the spirit and scope of the embodiment of the present invention. In this way, if these modifications and variations of the embodiment of the present invention fall within the scope of the claims of the present invention and their equivalent art, the present invention also intends to include these modifications and variations.

What is claimed is:

1. A touch control substrate, comprising:
    a base, comprising:
        a touch control region; and
        a peripheral region outside the touch control region;
    a first metal layer, on one side of the base, and comprising:
        a plurality of first touch control signal lines;
        wherein the first touch control signal lines are in the peripheral region;
    a first insulating layer, on one side of the first metal layer facing away from the base; and
    a second metal layer, on one side of the first insulating layer facing away from the first metal layer, and comprising:
        a plurality of second touch control signal lines electrically connected with the first touch control signal lines in a one-to-one correspondence mode;
        wherein the second touch control signal lines are in the peripheral region;
        an orthographic projection of an edge of a first end of the first touch control signal line in an extending direction of the first touch control signal line on the base does not overlap with an orthographic projection of an edge of a first end of the second touch control signal line electrically connected with the first touch control signal line in an extending direction of the second touch control signal line on the base;
        the orthographic projection of the edge of the first end of the first touch control signal line in the extending direction of the first touch control signal line on the base at least partially overlaps with an orthographic projection of the second touch control signal line on the base;
        the first end of the first touch control signal line is a tail end of the first touch control signal line close to the touch control region in the extending direction of the first touch control signal line, and the first end of the second touch control signal line is a tail end of the second touch control signal line close to the touch control region in the extending direction of the second touch control signal line; and
        the extending direction of the first touch control signal line is the same as the extending direction of the second touch control signal line;
    wherein the first end of the first touch control signal line comprises a first inclined surface;
    the first insulating layer comprises:
        a second inclined surface at a region covering the first inclined surface;
        a first plane and a second plane, connected with the second inclined surface in the extending direction of the first touch control signal line, and respectively located on two sides of the second inclined surface;
        wherein an orthographic projection of the second plane on the base does not overlap with orthographic projections of the first touch control signal lines on the base; and
        the edge of the first end of the second touch control signal line in the extending direction of the second touch control signal line at least extend to a junction of the second inclined surface and the second plane.

2. The touch control substrate according to claim 1, wherein the edge of the first end of the second touch control signal line in the extending direction of the second touch control signal line extend to the second plane.

3. The touch control substrate according to claim 1, wherein a line width of the first touch control signal line is equal to a line width of the second touch control signal line in an direction perpendicular to the extending direction of the first touch control signal line.

4. The touch control substrate according to claim 1, further comprising:
    a touch control electrode, disposed in the touch control region;
    wherein within a range of 50 microns near a connection position of the first touch control signal line as well as the second touch control signal line and the corresponding electrically connected touch control electrode, the first touch control signal line and the second touch control signal line are electrically connected through a first via hole penetrating through the first insulating layer.

5. The touch control substrate according to claim 4, wherein the second metal layer and/or the first metal layer further comprise/comprises:
    a plurality of connecting leads, extending from the touch control region to the peripheral region, and connected with the touch control electrode;
    wherein a first part of the second touch control signal line is connected with a connecting lead, and the first part of the second touch control signal line is adjacent to the first end of the second touch control signal line, and/or,
    a first part of the first touch control signal line is connected with a connecting lead, and the first part of the first touch control signal line is adjacent to the first end of the first touch control signal line; and
    an orthographic projection of the first part of the second touch control signal line on the base overlaps with an orthographic projection of the first part of the first touch control signal line on the base.

6. The touch control substrate according to claim 5, wherein both the touch control electrode and the connecting leads comprise a metal grid structure.

7. The touch control substrate according to claim 4, wherein the first end of the second touch control signal line covers at least one first via hole.

8. The touch control substrate according to claim 7, wherein the plurality of first via holes are sequentially arrayed in the extending direction of the second touch control signal line.

9. The touch control substrate according to claim 7, wherein a width-to-length ratio of each of the plurality of first via holes is approximately equal to 1.

10. The touch control substrate according to claim 7, wherein a first part of the second touch control signal line and the first end of the second touch control signal line at least cover three first via holes.

11. The touch control substrate according to claim 4, wherein the first insulating layer further comprises:
   at least one second via hole penetrating through a thickness of the first insulating layer;
   wherein the second touch control signal line is further electrically connected with the first touch control signal line through the second via holes; and
   a part of one side of the first part of the second touch control signal line away from the first end of the second touch control signal line covers at least one second via hole.

12. The touch control substrate according to claim 11, wherein a width-to-length ratio of the second via hole is greater than the width-to-length ratio of the first via hole.

13. A display apparatus, comprising:
   a touch control substrate according to claim 1;
   a flexible base substrate;
   a display layer, on the flexible base substrate; and
   an encapsulation layer, on the display layer;
   wherein the touch control substrate is on the encapsulation layer.

14. A touch control substrate, comprising:
   a base, comprising:
      a touch control region; and
      a peripheral region outside the touch control region;
   a first metal layer, on one side of the base, and comprising:
      a plurality of first touch control signal lines;
      wherein the first touch control signal lines are in the peripheral region;
   a first insulating layer, on one side of the first metal layer facing away from the base;
   a second metal layer, on one side of the first insulating layer facing away from the first metal layer, and comprising:
      a plurality of second touch control signal lines electrically connected with the first touch control signal lines in a one-to-one correspondence mode;
      wherein the second touch control signal lines are in the peripheral region; and
   a touch control electrode, disposed in the touch control region;
   wherein an orthographic projection of an edge of a first end of the first touch control signal line in an extending direction of the first touch control signal line on the base does not overlap with an orthographic projection of an edge of a first end of the second touch control signal line electrically connected with the first touch control signal line in an extending direction of the second touch control signal line on the base;
   the orthographic projection of the edge of the first end of the first touch control signal line in the extending direction of the first touch control signal line on the base at least partially overlaps with an orthographic projection of the second touch control signal line on the base;
   the first end of the first touch control signal line is a tail end of the first touch control signal line close to the touch control region in the extending direction of the first touch control signal line, and the first end of the second touch control signal line is a tail end of the second touch control signal line close to the touch control region in the extending direction of the second touch control signal line;
   the extending direction of the first touch control signal line is the same as the extending direction of the second touch control signal line; and
   within a range of 50 microns near a connection position of the first touch control signal line as well as the second touch control signal line and the corresponding electrically connected touch control electrode, the first touch control signal line and the second touch control signal line are electrically connected through a first via hole penetrating through the first insulating layer;
   wherein the first insulating layer further comprises:
   at least one second via hole penetrating through a thickness of the first insulating layer;
   wherein the second touch control signal line is further electrically connected with the first touch control signal line through the second via holes; and
   a part of one side of the first part of the second touch control signal line away from the first end of the second touch control signal line covers at least one second via hole.

15. The touch control substrate according to claim 14, wherein a width-to-length ratio of the second via hole is greater than the width-to-length ratio of the first via hole.

16. The touch control substrate according to claim 14, wherein the second metal layer and/or the first metal layer further comprise/comprises:
   a plurality of connecting leads, extending from the touch control region to the peripheral region, and connected with the touch control electrode;
   wherein a first part of the second touch control signal line is connected with a connecting lead, and the first part of the second touch control signal line is adjacent to the first end of the second touch control signal line, and/or,
   a first part of the first touch control signal line is connected with a connecting lead, and the first part of the first touch control signal line is adjacent to the first end of the first touch control signal line; and
   an orthographic projection of the first part of the second touch control signal line on the base overlaps with an orthographic projection of the first part of the first touch control signal line on the base.

17. The touch control substrate according to claim 14, wherein the first end of the second touch control signal line covers at least one first via hole.

18. The touch control substrate according to claim 17, wherein the plurality of first via holes are sequentially arrayed in the extending direction of the second touch control signal line.

19. The touch control substrate according to claim 17, wherein a first part of the second touch control signal line and the first end of the second touch control signal line at least cover three first via holes.

20. A display apparatus, comprising:
   a touch control substrate according to claim 14;
   a flexible base substrate;
   a display layer, on the flexible base substrate; and an encapsulation layer, on the display layer;
wherein the touch control substrate is on the encapsulation layer.

\* \* \* \* \*